United States Patent [19]

Carl et al.

[11] Patent Number: 4,765,568
[45] Date of Patent: Aug. 23, 1988

[54] METHOD AND SYSTEM FOR CONTROLLING THE ELEVATOR ASSEMBLIES OF AN AIRCRAFT

[75] Inventors: Udo Carl, Bremen; Homayoun Dilmaghani, Gessel, both of Fed. Rep. of Germany

[73] Assignee: Messerschmitt-Boelkow-Blohm Gesellschaft mit beschraenkter Haftung, Bremen, Fed. Rep. of Germany

[21] Appl. No.: 94,831

[22] Filed: Sep. 9, 1987

[30] Foreign Application Priority Data

Sep. 12, 1986 [DE] Fed. Rep. of Germany ....... 3631089
Sep. 20, 1986 [DE] Fed. Rep. of Germany ....... 3632068
Nov. 13, 1986 [DE] Fed. Rep. of Germany ....... 3638818

[51] Int. Cl.$^4$ ............................................. B64C 13/00
[52] U.S. Cl. .................................... 244/75 R; 244/87; 244/228
[58] Field of Search ...................... 244/75 R, 76 R, 87, 244/89, 221, 227, 228, 197

[56] References Cited

U.S. PATENT DOCUMENTS

| 2,704,646 | 3/1955 | Vogel | 244/75 R |
| 2,869,385 | 1/1959 | Geyer | 244/75 R |
| 3,773,282 | 11/1973 | Sands et al. | 244/227 |

FOREIGN PATENT DOCUMENTS

| 777273 | 6/1957 | United Kingdom . |
| 780759 | 8/1957 | United Kingdom . |
| 801080 | 9/1958 | United Kingdom . |
| 803577 | 10/1958 | United Kingdom . |
| 803576 | 10/1958 | United Kingdom . |
| 803572 | 10/1958 | United Kingdom . |
| 919266 | 2/1963 | United Kingdom . |

*Primary Examiner*—Galen Barefoot
*Assistant Examiner*—Rodney Corl
*Attorney, Agent, or Firm*—W. G. Fasse; D. H. Kane, Jr.

[57] ABSTRACT

A fly-by-wire control system for the elevator assemblies of an aircraft is equipped with a mechanical auxiliary control (8) and with a synchronizing coupling (10). The electrical control links connecting the controlling computers to the elevator drives are each equipped with an override mechanism (4,2). A mechanical cable link (9) of the auxiliary mechanical control (8) connects a pilot operated mechanical control member such as a pitch control wheel having a detent to the respective override mechanism. This combination makes sure that the pilot initiated control signals have performance priority over any other signals at all times. The synchronizing coupling (10) is arranged between the mechanical control links leading to the respective elevator flap drives to assure a symmetric flap deflection on both sides at high speed flight under failure conditions. Centering springs (12) assure a centered position of the flap if the respective flap side signal transmission linkage (4.4) is affected by a mechanical failure (rupture) at low speed.

9 Claims, 2 Drawing Sheets

METHOD AND SYSTEM FOR CONTROLLING THE ELEVATOR ASSEMBLIES OF AN AIRCRAFT

This application relates to U.S. Ser. No.: 094,824, which was filed on Sept. 9, 1987; and also relates to U.S. Ser. No.: 094,830, which was filed on Sept. 9, 1987. Both are allowed.

FIELD OF THE INVENTION

The invention relates to a method and system for controlling the elevator assemblies of an aircraft. Such a system includes pilot activated control members, autopilot computers, flight control computers, electro-hydraulic elevator assembly drive means for each of the right and left elevator assemblies, as well as mechanically controlled auxiliary elevator assembly drives operating in the so-called "fly-by-wire" manner.

DESCRIPTION OF THE PRIOR ART

It is known that elevator control assemblies of aircraft are constructed in the so-called "fly-by-wire" manner or technique, for example the air bus A320 has such a control system. In such a system so-called sidesticks are provided for the pilot to generate control signals which are transmitted through computer groups arranged in parallel, to electro-hydraulically controlled drive systems for physically operating the elevator flaps. Each elevator flap is equipped with two or three redundantly provided drive systems operating as so-called duplex or triplex devices.

In an emergency when the electrical flight control system fails there is no possibility of controlling the elevator assemblies of the aircraft. Such a disadvantage is especially undesirable in connection with failures at high speed flights when the elevator control fails only on one side of the aircraft while the control on the other side is still operable. In such a situation unpermissible nonsymmetries occur in connection with flight maneuvers with regard to the structural loading or stress of the aircraft.

OBJECTS OF THE INVENTION

In view of the foregoing it is the aim of the invention to achieve the following objects singly or in combination:

to improve conventional elevator assembly drive systems which comprise several redundant parallel drives, for example duplex or triplex drives, for both elevator assemblies of an aircraft in such a manner that the weight and complexity is reduced while the functional characteristics have at least the same or an improved degree of safety relative to a failure of the elevator control on both sides or on one side of an aircraft;

to provide in a fly-by-wire system, a simple mechanical elevator control as an emergency control if there is a total power failure in the onboard power supply; and to make sure that in case of an emergency or failure an asymmetric rudder deflection is avoided.

SUMMARY OF THE INVENTION

The above objects have been achieved in accordance with the invention by integrating a mechanically controlled elevator drive control system into a fly-by-wire elevator assembly control which is effective in parallel and synchronously on both elevator assemblies or flaps, whereby this mechanical emergency control system has an operational priority over the electrically controlled elevator control and drive systems.

More specifically, an aircraft elevator control system according to the invention is characterized by the following features. During normal electrical control of the elevator assemblies, the elevator flap control signals are supplied synchronously and simultaneously to two electrical control modular units operating in parallel to each other. A mechanical elevator control linkage, for each side of the aircraft, connects an output of the respective electrical modular control unit to the corresponding drive systems for the elevators flaps. Each of the electrical modular control units comprises a first section with electro-motors and gear drives and a second section with an override mechanism for allocating a first priority to an emergency control link when a failure occurs even during the electrical control. The arrangement is such that each active flight control computer receives information regarding both instantaneous elevator flap control positions as determined by the outputs of both electrical modular control units, whereby the flight control computers recognize a non-operating control unit or an asynchronously operating control unit, whereupon faulty components are either switched-off or a switch-over is performed by the flight control computers. A mechanical emergency control member enables the pilot to respond to a failure of the entire electric flight control system by providing a mechanical control signal for the control of the elevator assemblies. This mechanical control signal is transmitted to each of the two modular control units through two mechanical cable links in response to an operation of the emergency control member by the pilot. The override mechanism provides each electrical modular control unit with a capability of allocating a first performance priority to the mechanical control signal produced by the pilot by actuating the mechanical emergency control member even during operation of the electrical control. Thus, the mechanical control overrides any electrical control. During electrical control, when the mechanical control is not activated, the elevator control signals cause a follow-up movement of the mechanical control member synchronously and proportionally to the electrical control signals in response to a respective feedback command. The mechanical emergency control member comprises a pitch control member with a detent for assuring an emergency control through one control cable link even if the other cable of a pair of cable links should be jammed, said pitch control member with its detent being so constructed that during the normal electrical control the generation of higher priority failure signals are prevented and the above mentioned first performance priority of the mechanical control signal is assured. The electrical modular control units supply identical control signals to the control links leading to the elevator flap drives and to the emergency control member. A mechanical synchronizing or coupling unit is operatively arranged between the mechanical coupling links leading from the two modular control units to the respective elevator drive systems, for assuring a synchronization of the elevator drive systems even when the mechanical emergency control is effective. In a preferred embodiment centering springs (12) are provided in the mechanical control links to the elevator drive systems. These centering springs prevent an uncontrolled deflection of an elevator flap if the respective mechanical control link should fail, e.g., break.

BRIEF DESCRIPTION OF THE DRAWINGS

In order that the invention may be clearly understood, it will now be described, by way of example, with reference to the accompanying drawings, wherein.

Figure 1:
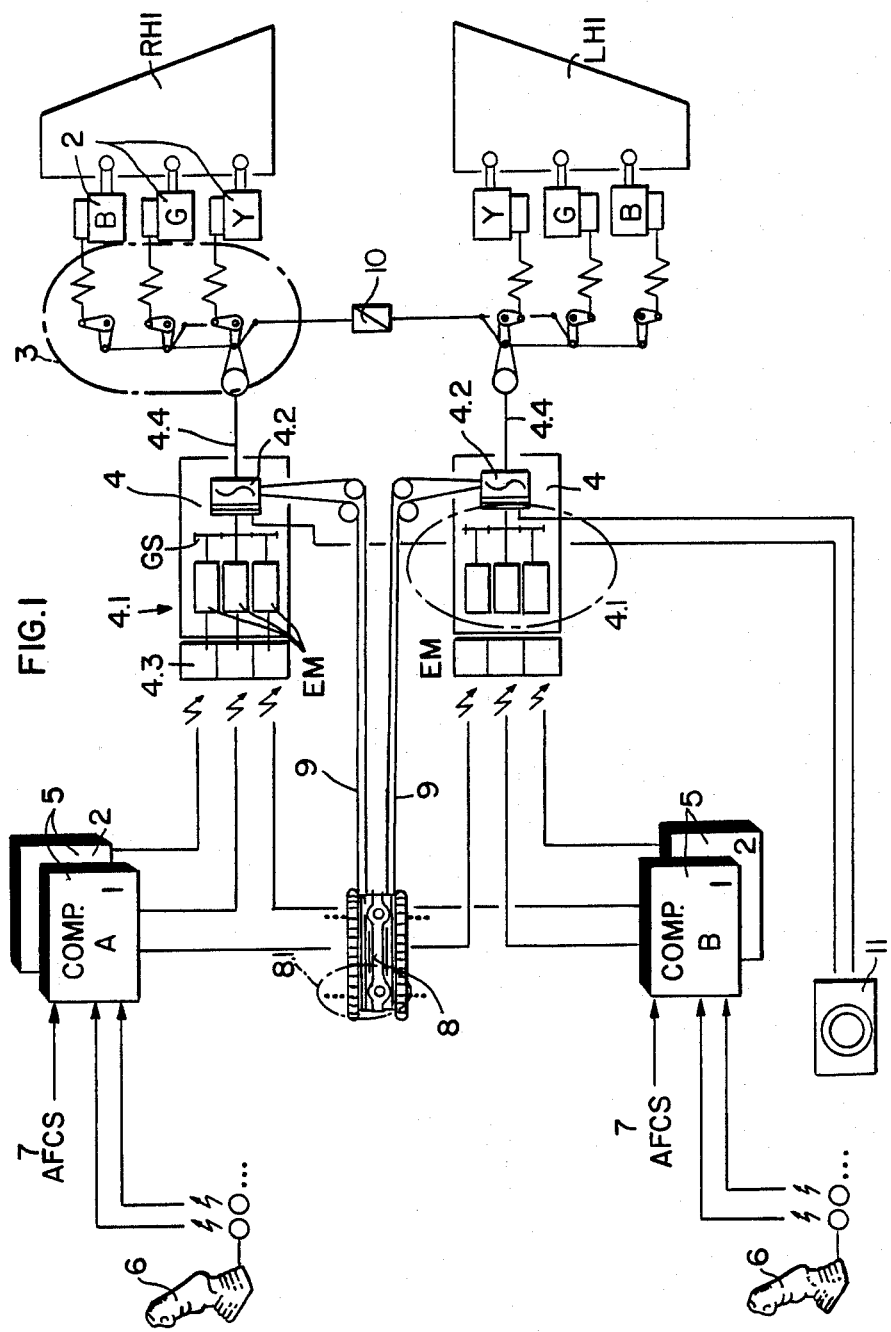
FIG. 1 is a mechanical and electrical diagram of a control system according to the invention.

DETAILED DESCRIPTION OF PREFERRED EXAMPLE EMBODIMENTS AND OF THE BEST MODE OF THE INVENTION

Two elevator flaps RH1 on the right side of an elevator assembly of an aircraft and LH1 on the left side of the elevator assembly are each driven by a triplex drive system 2 each comprising three parallel drive devices B, G, and Y. These drive devices are mechanically controlled and operated. The control signals are transmitted through a mechanical transmission linkage 3 partly constructed in a fail-safe manner. The signal input takes place through an electrical control modular unit 4 comprising three electrical motors EM operating through a gear system GS and an override mechanism 4.2. The motors form a unit 4.1 which has three control inputs 4.3 connected to flight control computers 5. Thus, the input signals are not primarily provided by the pilot operated control stick. The right and left modular units 4 are provided simultaneously and synchronously with the same control commands or signals coming from the flight control computers 5. Thus, both elevator flaps on the left and right sides receive the same deflection orders. Each of the active computers or computer groups 5 receives simultaneously the position of both output signals of the control modular units 4 from sensors 13a-b via the signal transmission lines 14a-d so that a synchronous operation is monitored and so that both sides are switched-off or switchedover in response to the occurrence of a fault.

The drive commands or signals are produced conventionally by taking into account signals from sensor tabs of a pilot activated member such as a side stick 6 and further taking into account signals of an automatic flight control system 7 including an autopilot in the computers 5.

The emergency steering of the elevator flaps, for example when the onboard power supply of the aircraft fails, and while one or several of the hydraulic drive systems 2 provided in triplicate (B, G, Y) are still functional, is accomplished according to the invention by an emergency steering member 8 for the elevator flap control. The member 8 enables the pilot to transmit a mechanical control signal to one or more still functional hydraulic drive systems B, G, Y, of the elevator flaps 1. The emergency control member 8 may be constructed as a double steering wheel or as a double lever member with a release detent 8.1.

The emergency control member 8 is operatively connected to the override mechanism 4.2 of each control modular unit 4 forming part of the normal, electrical flight control system. The connection is accomplished by means of a double mechanical load transmitting link 9, for example, in the form of a cable control. The engagement of the load transmitting linkage 9 provided in duplicate, into the control modular units 4 is accomplished through said override mechanisms 4.2. These override mechanisms 4.2, a spring loaded coupling or detent device as known from A320 comprise mechanical structural components operating as follows:

Under normal operating conditions the control modular units 4 make sure that the deflection of the elevator flaps 1 is transmitted to the emergency control member 8 through the cable connection 9 causing the member 8 to synchronously and proportionally follow the deflection of the flaps 1. In other words, under normal operating conditions the emergency control member 8 and the flaps 1 move in unison. However, when the pilot operates the emergency control member 8, for example, because he has recognized that the electrical control system operates in a faulty manner, he generates a control signal with the aid of the emergency control member 8 and this emergency control signal does not match with the control signal produced by the computer 5 and transmitted through the motor gear units 4.1. In such a situation the override mechanism 4.2 establishes a higher priority for the pilot initiated control signal introduced through the cable drive or linkage 9 and the elevator flaps are operated in accordance with the higher priority control signal from the pilot.

It is not altogether possible to exclude the situation in which one of the cables of the links 9 is jammed. In such a situation and due to the priority of the mechanical signal over the electrical control signal, the override mechanism 4.2 would not provide an emergency control signal to the elevator drives. In order to avoid such a situation, the emergency control member 8 is provided with said release detent mechanism 8.1 comprising spring biased release balls arranged between two hand wheels which are effective on two separate cable links or lines 9. In this manner it is possible for the pilot to effectively control at least the other cable link if one of them should be jammend or stuck. Thus, an intentional elevator control signal may still be transmitted mechanically to the elevator drives for the elevator control during low speed flight.

Figure 2:
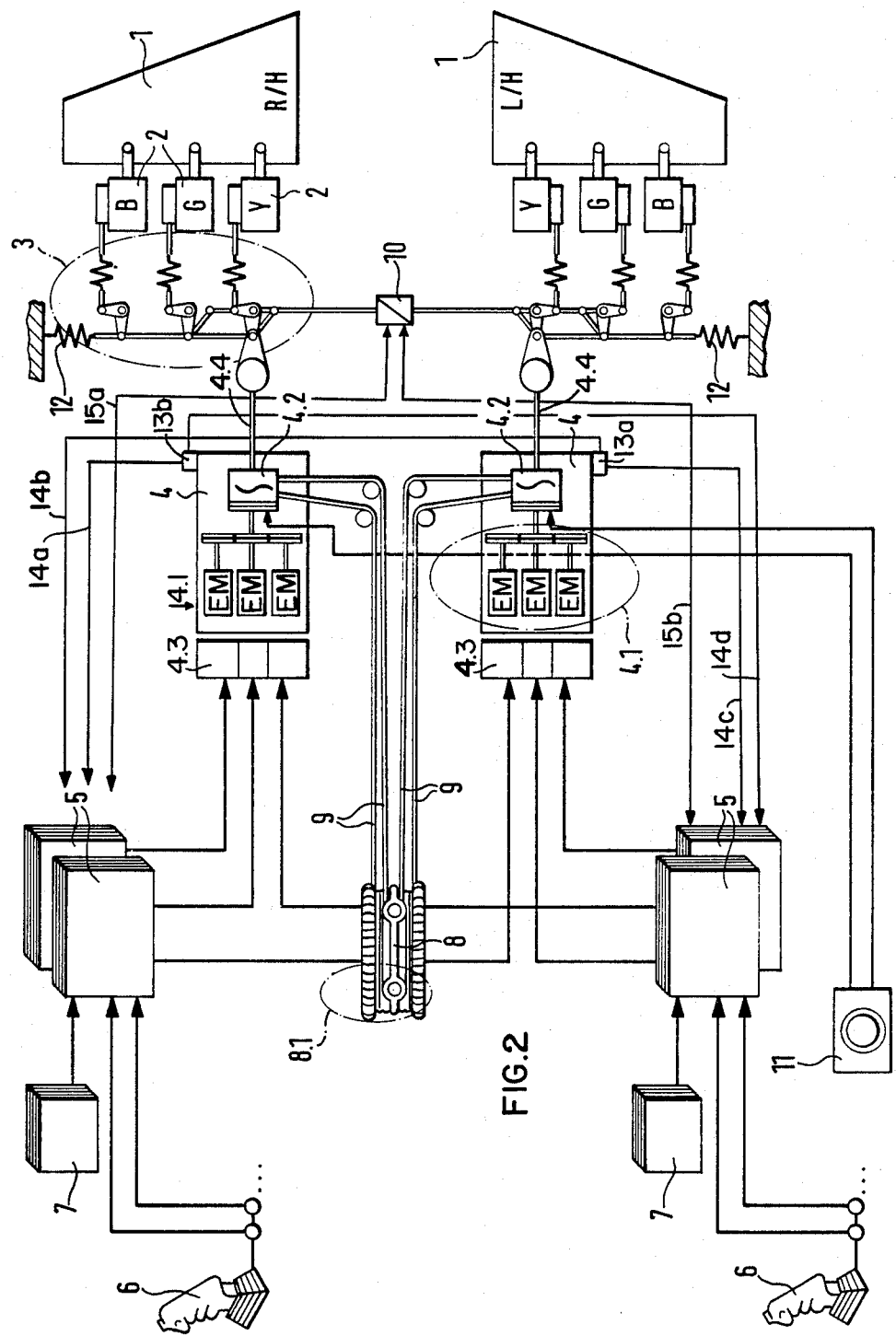
FIG. 2 is the system according to FIG. 1 modified by a pair of centering springs for preventing an uncontrolled elevator flap deflection in an emergency.

In order to prevent an asymmetric flap deflection during high speed flight between the left and right elevator assemblies even in an emergency situation, the control modular units 4 feed identical control signals in the respective control transmitting links 3 and 9. The right and left mechanical signal transmitting links 3 are mechanically coupled to each other by a synchronizing unit 10. Additionally, the mechanical signal transmitting links 3 are equipped with centering springs 12 as shown in FIG. 2. These centering springs 12 are important for low speed flight and make sure that the mechanical links 3 on both sides of the aircraft are adjusted and maintained in a centered position relative to a zero reference in case of a mechanical failure (rupture) of the mechanical transmission link 4.4. The emergency control member 8 with the connecting control double cable links 9 are so arranged that a synchronous drive is enforced on both sides so that the right and left elevator flaps are deflected to the same symmetrical extents. Thus, it is clear that the mechanical synchronizing unit 10 which is switched on by the computers 5 only at high speed flight via the signal lines 15a-b, makes sure that a mechanically synchronized elevator flap deflection is enforced also at high speed flight even if the electrical control systems should fail.

The mechanical synchronizing and coupling unit 10 is not effective during low speed flight. Thus, it is conceivable that a simple mechanical trouble, for example, a fracture of the transmission link 4.4 in the signal transmission between the output of the modular control units 4 and the control linkage 3 could lead to any random faulty deflection of the elevator flap on the side which has the mechanical faults. In order to avoid such a situation, the two centering springs 12 shown in FIG. 2 are arranged to make sure that the elevator flap that is exposed to the mechanical fault is centered in a zero position, that is in a middle position, by a respective null signal applied to the hydraulic adjustment systems B, G, and Y.

Under normal operating conditions in a system according to the invention the electrical motors EM in the modular control units 4 are either operated in unison or individually by one or more of the flight control computers 5 which all may be of the same type or they may be of different types so that a certain redundancy increases the fail-safe characteristic of the electrically operated control system. The number of electro-motors provided in the control modular units 4 may be two or more. Especially in a system in which each control modular unit 4 comprises but two electrical motors for saving weight and simplifying the system, and having regard to the failure probability of both electro-motors simultaneously in the same modular control unit, the described mechanical synchronization and emergency controllability of the elevator flaps according to the invention have a special advantageous significance. The electrically transmitted elevator control is possible even if one of the modular control units 4 has failed. In this instance the electrically produced control signals of the other side still having an operational modular control unit 4, are transmitted through the cable links 9 as well as through the coupling rods interconnecting the two sides through the synchronizing unit 10 during high speed flight.

A testing switch 11 connected to both override mechanisms 4.2 as shown in FIG. 2, may be provided for use by the pilot for further improving the operability of the elevator emergency control. Thus, the pilot is enabled to perform preflight tests to make sure that these units are operational.

The present emergency control member 8 may be a so-called "pitch control wheel" with a detent which as such is disclosed, for example in DE-OS No. 1953513. The override mechanism 4.2 as such is also a known mechanical coupling disclosed, for example, in DE-OS No. 3151623.

In accordance with the invention it is possible to achieve a fail-safe characteristic which is at least the same or better than that of the prior art, even if only two electro-motors EM are used in each of the modular control units 4, that is, a total of four electro-motors. If one electro-motor fails prior to starting, and thereafter an electrical double failure occurs so that only one electrical motor EM remains operable, the present system still would be workable. However, the probability that only one electrical motor would remain effective, is in the order of $10^{-9}$ per flight hour which is quite acceptable. Thus, the mechanical synchronization in accordance with the invention achieves advantages not predictable on the basis of the prior art.

The synchronizing coupling 10 is switched-on for high speed flight, is, as such, a known mechanical device in principle used, for example in Airbus A30-0/A310 - aircraft.

Although the invention has been described with reference to specific example embodiments, it will be appreciated, that it is intended to cover all modifications and equivalents within the scope of the appended claims.

What we claim is:
1. A method for controlling elevator assemblies of an aircraft, comprising the following steps:
    (a) normally supplying identical electrical flight control signals in parallel through two electrical control units each including an override mechanism arranged in series between each electrical control unit and respective mechanical control links to a plurality of drive means for each of said elevator assemblies,
    (b) supplying, in an emergency, mechanically generated control signals through dual mechanical control links to each of said override mechanisms,
    (c) providing with the aid of said override mechanism, a performance priority of said mechanically generated control signals for controlling and operating said elevator assemblies in an emergency, and
    (d) mechanically coupling said mechanical control links by a mechanical synchronizing device at least during high speed flight for assuring a symmetric flap deflection of said elevator assemblies.

2. A system for controlling elevator assemblies of an aircraft, comprising fly-by-wire control means including pilot activated mechanical auxiliary control means, autopilot and flight control computer means, two electrically controlled control units (4) connected to said computer means, right and left elevator flaps (RH1, RL1), respective drive means (2) connected to said right and left elevator flaps, mechanical connecting links (3) between said drive means and said electrically controlled control units, means for normally synchronously (simultaneously) supplying elevator flap control signals from said computer means to said two electrically controlled control units (4) operating in parallel to each other, each of said electrically controlled control units (4) comprising a first section with electro-motors and gear drives and a second section with an override mechanism (4.2) for allocating a first priority to a mechanical emergency control signal generated by said auxiliary control means when a failure occurs in the electrical control, means for providing each active flight control computer means with information regarding instantaneous elevator flap controlled positions as determined by outputs of said two electrically controlled control units, whereby the flight control computer means recognize a non-operating control unit or an asynchronously operating control unit, whereupon faulty components are either switched-off or a switchover is performed by the control computer means, said pilot activated mechanical auxiliary control means comprising a mechanical emergency control member enabling the pilot to respond to a system failure by providing a mechanical control signal for the control of the elevator assemblies, dual mechanical cable connections between each of said override mechanisms and said auxiliary control means for transmitting a mechanical control signal to each of the two override mechanisms in response to an operation of the emergency control member by the pilot for overriding any electrical control signal, wherein during electrical control, when said auxiliary control means is not activated, electrical elevator control signals cause a follow-up movement of the auxiliary control means synchronously and proportionally to the electrical control signals in response to a respective feedback command, wherein said mechanical emergency control member comprise a pitch control member with a detent for assuring an emergency control through one control cable link even if the other cable control link of said dual mechanical cable connections should be jammed, said pitch control member with its detent being so constructed that during a normal electrical control the generation of higher priority failure signals are prevented and the above mentioned first performance priority of the mechanical control signal is assured if said electrically controlled control means are supplying identical control signals to the mechanical control links leading to the elevator flap drives and to the emergency control member, and a mechanical synchronizing or coupling unit operatively arranged between the mechanical coupling links leading from the two electrically controlled control means to the respective elevator drive means (2) for assuring a synchronization of the elevator drive systems even when the mechanical emergency control is effective at high speed flight.

3. The system of claim 2, wherein said mechanical emergency control means comprise a mechanical double control member, such as duplicated control wheels with a release detent mechanism 8.1 between these wheels for operating said cable links provided in duplicate between said mechanical emergency control means and said override mechanism.

4. The system of claim 2, wherein said mechanical control linkage means between said elevator drive systems and said electrically controlled control means have a partly fail-safe construction, and wherein said mechanical synchronizing or coupling unit is connected to both mechanical control linkage means so as to be effective even when said mechanical emergency control is effective at high speed flight.

5. The system of claim 2, wherein said electrically controlled control means comprise electric motor means which are controlled by one or more flight computers of a single type or of different types.

6. The system of claim 5, wherein said electric motor means comprise at least two electric motors in each of said electrically controlled control means.

7. The system of claim 2, further comprising testing switch means (11) arranged for testing the operability of said mechanical emergency control means.

8. The system of claim 2, wherein, under normal flight conditions, said electrically controlled control means entrain said mechanical emergency control means, whereby said mechanical emergency control means perform a follow-up movement thereby indicating to the pilot that said mechanical emergency control means are free of any jamming.

9. The system of claim 2, further comprising centering springs (12) provided in said mechanical connecting links (3) for preventing an uncontrolled deflection of an elevator flap if the respective mechanical transmission link (4.4) should fail.

* * * * *